United States Patent [19]

Alston et al.

[11] Patent Number: 4,717,159

[45] Date of Patent: Jan. 5, 1988

[54] METHOD AND APPARATUS FOR SEATING AND SEALING A PITOT TUBE TYPE FLOW METER IN A PIPE

[75] Inventors: Norman A. Alston, Boulder; Horst W. Kalin, Longmont, both of Colo.

[73] Assignee: Dieterich Standard Corp., Boulder, Colo.

[21] Appl. No.: 871,366

[22] Filed: Jun. 6, 1986

[51] Int. Cl.⁴ .......................... F16J 15/10; F16J 15/18; F16L 41/08

[52] U.S. Cl. ....................................... 277/1; 73/861.65; 73/861.67; 277/4; 277/9; 277/105; 277/110; 285/158; 285/348

[58] Field of Search ................... 277/102, 103, 1, 105, 277/110, 112, 106, 123, 125, 9, 9.5, 4; 73/861.65, 861.66, 861.67; 285/158, 348, 351, 338

[56] References Cited

U.S. PATENT DOCUMENTS

| | | | |
|---|---|---|---|
| 249,151 | 11/1881 | Allen | 411/545 |
| 315,350 | 4/1885 | Shook | 277/105 |
| 862,930 | 8/1907 | Norris | 277/106 |
| 1,198,514 | 9/1916 | Bartlett | 277/110 |
| 1,250,238 | 12/1917 | Spitzglass | 73/861.66 |
| 1,841,882 | 1/1932 | De Francisci | 277/112 X |
| 2,006,529 | 7/1935 | Wheeler | 277/105 |
| 2,148,038 | 2/1939 | Raybould | 277/105 |
| 2,150,887 | 3/1939 | Mueller | 277/110 X |
| 2,190,419 | 2/1940 | Evarts | 277/112 |
| 2,416,917 | 3/1947 | Gleeson | 277/105 X |
| 2,720,267 | 10/1955 | Brown | 277/123 X |
| 3,047,298 | 7/1962 | St. Clair et al. | 277/4 |
| 3,265,398 | 8/1966 | Hansen et al. | 277/105 |
| 3,313,550 | 4/1967 | Culman | 277/105 X |

FOREIGN PATENT DOCUMENTS

| | | | |
|---|---|---|---|
| 229649 | 10/1963 | Austria | 277/125 |
| 822118 | 12/1937 | France | 277/110 |

*Primary Examiner*—Allan N. Shoap
*Attorney, Agent, or Firm*—Edwin L. Spangler, Jr.

[57] ABSTRACT

This invention relates to a method for seating a pitot tube type flow meter against the remote wall of the pipe in which it is being installed and subsequently sealing same within the tubular fitting through which it enters the pipe, such method comprising using a movable abutment to push compressible packing contained within an annular space provided between the outside of the pitot tube and the inside of its tubular fitting against a fixed abutment on the pitot tube thereby forcing the latter inward until it bottoms on the remote pipe wall and thereafter continuing to advance the movable abutment to narrow the gap between it and the fixed abutment so as to compress the packing between the two until it expands to fill the annular space and form a fluid-tight seal around the pitot tube. The invention also encompasses the novel apparatus for carrying out the above-described method.

15 Claims, 5 Drawing Figures

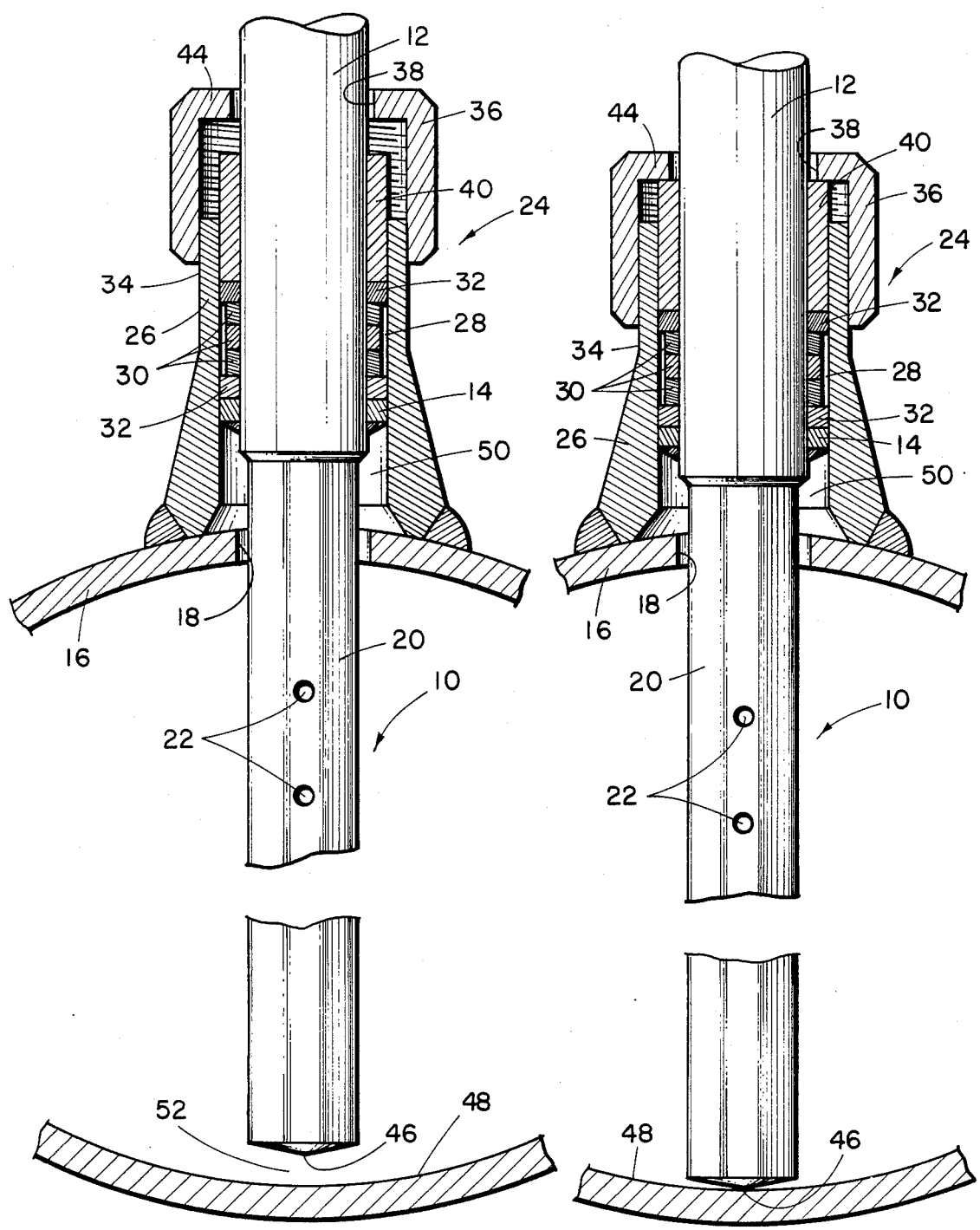

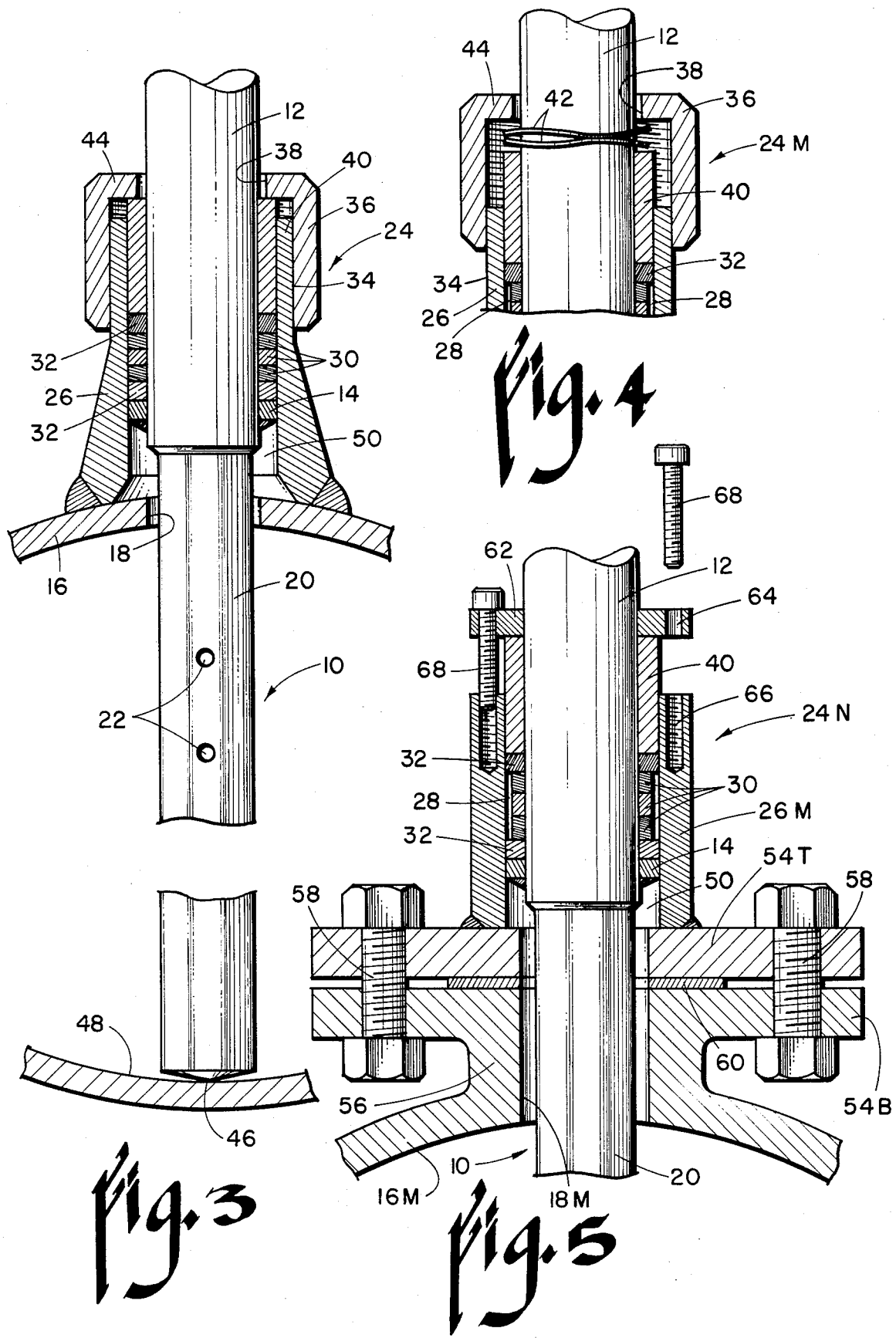

METHOD AND APPARATUS FOR SEATING AND SEALING A PITOT TUBE TYPE FLOW METER IN A PIPE

In copending U.S. patent application Ser. No. 769,431, filed Aug. 26, 1985, now U.S. Pat. No. 4,645,242 issued Feb. 24, 1987, owned by the assignee of the present application, a high-pressure blowout-proof mounting for a pitot tube type flow measurement device is disclosed wherein a fixed abutment encircling the body of the probe and movable therewith is positioned to be engaged by an inturned stop-forming flange formed integral with a cap nut that screws onto a sealable tubular compression fitting welded or otherwise attached to the pipe at the opening in its sidewall where the probe enters same. As illustrated, this compression fitting has two threadedly interconnected parts which cooperate with one another when tightly assembled to engage, grip and form an annular fluid-tight seal around the cylindrical probe body effective to securely maintain it in its proper position extending diametrically across the pipe in which the flow is to be measured. The cap nut and its inturned flange-forming stop only become operative to engage the annular abutment carried by the probe body to prevent the latter from being blown out of the pipe, when purposely or through an oversight, the compression fitting that holds same in place, is loose. This may be done intentionally when the pipe is pressurized and the probe is to be retracted and withdrawn from the flow but not removed from its mounting.

From a functional standpoint, the preferred placement of pitot tube type flow measurement instruments is extending diametrically across the pipe with the remote end in engagement with the opposite pipe wall. It is only in this position that the precisely-located upstream and downstream-facing pressure-sensing ports lie where they should be to provide the differential pressure measurement information necessary to produce an accurate reading. It has also been discovered that having the probe body "bottomed-out" so to speak on the opposite pipe wall is very important from an operational standpoint, especially in large diameter pipes containing fast-moving fairly viscous fluids. If the remote end of the probe is left to swing free, it oftentimes begins to vibrate and sometimes even breaks off, either of which is most undesirable.

In those blowout-proof installations where the probe is provided with some kind of fixed abutment designed to engage a stop in the event of a loose connection, this same fixed abutment may serve a dual function of a stop positioned and adapted, either intentionally or inadvertently, to engage the near pipe wall adjacent the probe-receiving opening therein or some other obstruction projecting, perhaps, from the mounting hardware thus limiting the degree of probe penetration into the pipe. When this happens, there is no assurance whatsoever that the remote end of the probe will bottom-out against the remote pipe wall before the abutment engages its near wall. As a matter of fact, the allowable dimensional variations in the i.d. of pipe being what they are, it is almost a sure bet that if an abutment on the probe body is selectively positioned to engage and stop against the near pipe wall at the same time the remote end of the probe strikes its opposite wall based upon the assumption that the pipe has an accurate i.d. and wall thickness, that in a good percentage of the installations the probe will not reach to the opposite wall at all but terminate well short thereof. Alternatively, while not as serious a problem in that the probe can bottom-out properly, some provision must be made for accommodating an undersized pipe in the sense of being able to maintain a secure connection as well as a fluid-tight annular seal.

Even in those installations in which the probe body is free of any abutment that could possibly interfere with its bottoming-out on the opposite pipe wall, a very real chance still exists that it will be installed improperly and not do so. To begin with, positioning of the probe, of necessity is done "blind" in that the installer cannot see where the remote end of the probe is relative to the opposite pipe wall. Moreover, realizing that the probe is a delicate precision measuring instrument, he or she is reluctant to bang it hard into the opposite wall for fear of damaging the unit. Even though properly seated, there is no assurance that the probe will not back off a little while the compression fitting or other seal is being made.

A considerable improvement in high pressure mountings for pitot tube type flow meters would result if one could insure that its remote end was bottomed-out against the remote pipe wall and remained so while the sealed connection was being made. If, incidentally, this same construction could be relied upon to hold the probe securely in place within the pipe, produce a fluid-tight seal therearound as well as provide blowout protection in the rare event of a loose connection, all the better.

The closest prior art known to applicant is contained in a single patent, namely, the early U.S. Pat. No. 1,250,238 to Spitzglass where in FIGS. 1 and 6 he illustrates two different types of packings 18 designed to form a fluid-tight annular seal between what he denominates his sleeve 16 and his plug 9. It is important to note, however, that as stated in column 1 of page 2 of the specification beginning down at line 40 that ". . . collar 7 is secured to the plug member 9 to hold it and the sleeve together." As stated the function of collar 7 must be one of holding the sleeve 16 and the plug 9 together to prevent relative axial movement therebetween although it would appear that they could, perhaps, rotate relative to one another. This being the case, while the remote end of the probe is shown seated against the opposite pipe (tube 8) wall, if this were not the case, no amount of relative movement of so-called "packing gland 17" against "packing 18" would be effective to seat the remote end of the probe since the connection between the plug 9 and sleeve 16 provided by collar 7 would prevent it. Apparently, seating of the probe against the opposite pipe wall is achieved by screwing the sleeve 16 deeper into tube 8 by means of unnumbered threaded opening that receives the assembly although the extent to which this can be done is apparently quite limited due to the tapered thread on the sleeve which can only enter the tube so far.

The description of FIG. 6 makes no mention of the packing subassembly but it only appears to differ in the cross section of the packing 18 and the fact that there is no annular shoulder inside the sleeve 16 for the packing gland 17 to abut against. As such, it is difficult to ascertain from the drawings whether there is anything in the way of a stop or shoulder analogous to what is seen in FIG. 1 to prevent the packing gland from moving axially inward to further compress the packing. Nevertheless, if as stated the collar holds the sleeve and the plug together, then using the packing gland to compress the packing cannot have the effect of moving the plug and probe axially inward relative to the sleeve to seat the probe against the remote wall of the tube.

Even if one were to assume that Spitzglass' sleeve and plug were not fastened together as he says by collar 7 and, therefore, presumably could not move axially relative to one another and, in addition, assume that the thin unnumbered washer-like member on the opposite side of the collar from the packing 18 was compressible, it is perfectly obvious that the maximum degree of axial adjustment to insure that the probe seats securely against the opposite tube wall would be a tiny fraction of an inch which is not anywhere near adequate to accommodate the dimensional variations likely to exist in a tube or a pipe having an internal diameter literally hundreds of times greater than the overall thickness of the washer shown. Such assumptions also presume that Spitzglass even recognized the problem which it is apparent he did not do. Instead, he was merely applying conventional packing gland technology to seal the probe in its mounting hardware.

Applicant has now discovered a virtually foolproof method and apparatus for insuring that the probe body is securely seated against the opposite pipe wall and, while doing so, he forms a fluid-tight seal around the probe and prevents it from blowing out under pressure should the seal fail or not have been made tight in the first place. This desirable end is accomplished by the novel expedient of first using the packing and a movable abutment movable thereagainst to push against a fixed abutment on the probe body for the purpose of driving the remote end thereof against the opposite pipe wall. Thereafter, once the probe has bottomed-out and no further inward movement of it or the fixed abutment carried thereby relative to the pipe is possible, the movable abutment is moved farther in to narrow the gap left between it and the fixed abutment so as to squeeze the packing therebetween and cause the latter to expand into fluid-tight sealed relation to the probe by compressing it into the annular space left between the probe and the tubular housing therefor. To accomplish the above, a sufficient gap must be left between the fixed abutment and any fixed obstruction between it and the remote end of the probe to accommodate any gap that might be encountered between the probe end and the adjacent pipe wall resulting from dimensional irregularities, deformation of the pipe or other anomalies. If the element of the assembly responsible for moving the movable abutment relative to the fixed one is also adjustably attached for relative axial movement to the tubular sleeve welded to the pipe that houses and guides the probe body for insertion into the opening therefor in said pipe wall, such element will also function when thus connected to define a stop effective to prevent the probe from blowing out under pressure should the seal fail or come loose or be loosened.

It is therefore, the principal object of the present invention to provide a method and apparatus for insuring that a pitot tube type flow measuring instrument has its probe body bottomed-out against the remote wall of the pipe in which it is located preparatory to forming the mechanical connection between the unit and the tubular sleeve by means of which it is attached to the pipe.

A second objective is the provision of a method and apparatus of the type aforementioned which also functions to seal the probe body within its mounting once the probe is in the proper position and the connector subassembly continues to be actuated.

Another object of the invention herein disclosed and claimed is to provide, in addition to the aforementioned objectives, a blowout proof mounting that is effective to prevent the probe from coming out of its mounting even though the seal is loose or loosened.

Still another object of the within-described invention is to provide a combination pitot tube mounting assembly that seats the probe body in proper position against the remote pipe wall, seals the body within the mounting and prevents the latter from being blown out should the seal fail or be loosened.

An additional objective is to provide a sequential mounting method for pitot tube type flow measurement probes and the like which first insures that the probe body is properly positioned and holds it there before forming a fluid-tight seal therearound.

Further object are to provide a mounting assembly and method of using same of the character described which are simple to use, inexpensive, effective, versatile and require no special skills to operate.

Other objects will be in part apparent and in part pointed out specifically hereinafter in connection with the description of the drawings that follows, and in which:

FIG. 1 is a diametrical section, portions of which have been broken away to conserve space, showing the pitot tube and its mounting assembly in relaxed position preparatory to seating the remote end of the probe body against the opposite pipe wall;

FIG. 2 is another diametrical section similar to FIG. 1 and to the same scale but showing the probe body in seated position and the movable abutment about to continue its inward excursion to compress and expand the packing into fluid-tight sealed relation against the fixed abutment carried by the probe;

FIG. 3 is still another diametrical section similar to FIGS. 1 and 2 but differing therefrom in that it reveals the probe body seated, the annular fluid-tight seal formed therearound and the blowout prevention subassembly in place;

FIG. 4 is a fragmentary diametrical section to the same scale as the preceding figures showing a modified version of the assembly wherein a pair of spring washers are interposed between the movable abutment and the packing; and, FIG. 5 is another fragmentary diametrical section showing a still further modification in which the cap nut of the preceding embodiments used to move the movable abutment is replaced by a simple flat plate bolted to the tubular guide sleeve of a conventional flanged side-opening port in the pipe wall.

Referring next to the drawings for a detailed description of the present invention and, initially, to FIGS. 1, 2 and 3 for this purpose, reference numeral 10 has been selected to broadly designate the pitot tube type flow measurement probe having in the particular form illustrated a slightly oversize cylindrical body section 12 to which is permanently attached a fixed abutment 14, the latter taking the form of an annular rib welded to the probe body in the particular form shown. A large diameter pipe 16 having a probe-receiving opening 18 therein loosely receives the portion 20 of the probe body that will lie within the flow and which contains the pressure-sensing ports 22.

A mounting assembly that has been indicated in a general way by reference numeral 24 performs several functions including that of guiding the portion 20 of the probe body diametrically across the pipe at right angles to its axis, detachably fastening the unit to the pipe, forming a fluid-tight seal therearound and, incidentally, providing same with blowout protection in case the seal fails or is loosened. In FIGS. 1 through 4, inclusive, it can be seen that in the particular form shown the aforementioned assembly includes among other things a tubular guide sleeve 26 which is welded or otherwise attached to the outside of the pipe 16 and which loosely receives the probe body so as to leave an annular space 28 therebetween for the compressible packing 30 along with the relatively non-compressible spacers 32 shown on both the top and bottom thereof in the particular embodiment illustrated. These spacers 32 are not required in the assembly and, therefore, may be left out; however, their inclusion is sometimes recommended to insure a proper fluid-tight annular seal. The axis of this guide sleeve should be oriented such that it intersects the axis of the pipe at right angles thus insuring that the probe body axis does likewise. Obviously, the sleeve should be centered as close as is practicable over probe-receiving opening 18. Sleeve 26 is shown externally threaded at 34 to receive an internally-threaded and centrally-apertured cup that defines a cap nut 36, the central opening 38 in the top thereof of which is sized to loosely pass the probe body 12 as shown. This cap nut is the actuator of the reference numeral 24 assemblies that functions to move the movable abutment 40 up and down relative to the probe body 12 within the annular space 28 left between it and its housing or sleeve 26 for the purposes which will be explained in detail presently. As revealed in FIGS. 1-4, the cap nut 36 and movable abutment 40 are separate parts constituting a movable subassembly; however, they may be formed integral with one another especially if a washer-like spacer 32 which can effectively resist the resulting relative rotational movement of the movable abutment is interposed between the latter and the rather more frail and easily damaged packing 30.

As illustrated in FIGS. 1, 2 and 3, the movable abutment comprises a sleeve slidable along the probe body. In the modified assembly 24M of FIG. 4, on the other hand, the movable abutment includes not only sleeve 40 but one or more wave or other type of spring washers 42 interposed between it and the inturned flange 44 bordering the opening 38 in the cap nut. The packing 30 is shown as comprising a stacked series of rings made out of any one of a number of types of conventional compressible packing materials capable of expanding within the annular space 28 between the probe body and the guide sleeve 26 housing same to form a fluid-tight annular seal therearound. This packing together with spacers 32 are, of course, confined within annulus 28 between the fixed abutment 14 on the probe body and the movable abutment 40 thereabove.

Next, with particular reference to FIG. 1 it can be seen that in the particular form shown, the maximum outside diameter of the fixed abutment 14 is such that it will not pass through the probe-receiving opening 18 in the near pipe wall nor would it likely pass any other obstruction therebetween such as, for example, a projection on sleeve 26 projecting into annular space 28 which could, conceivably form a part of the mounting assembly 24. Thus, the portion of the near wall of the pipe 16 bordering opening 18 or some other obstruction could, conceivably, constitute a stop effective to prevent the remote end 46 of the probe body from reaching and bottoming-out on the opposite pipe wall 48. Accordingly, knowing the permissible dimensional variations in a given size pipe fabricated from various materials which, by the way, can be substantial, it is important that the gap 50 left between the opposed surfaces of the pipe 16 or any other obstruction and the fixed abutment 14 at least equal, and preferably substantially exceed, the maximum oversize variation in the diameter of the pipe into which the probe will be introduced. When thus dimensioned, one is assured that the remote end 46 of the probe can seat securely against the opposite pipe wall 48 before the fixed abutment 14 can contact any stop-forming obstruction on the near wall of the pipe or sleeve 26.

As shown in FIG. 2, the gap 50 is sized so that when the probe remote end is seated against the opposite wall of the pipe 16 and the probe is sealed in the tubular guideway, there is no contact between the fixed abutment 14 and the pipe wall adjacent to that fixed abutment. Hence, there is no compressive force applied to that fixed abutment by that pipe wall after the sealing is completed.

While on the subject of dimensional anomalies in the pipe, it is, of course, as much of a possibility that the pipe is undersized as oversized. If undersized, there is no problem of the probe body seating against the remote pipe wall; however, one must insure that cap nut 36 is securely fastened to sleeve 26. Accordingly, the length of movable abutment 40 can be selected to accommodate any particular oversize or undersize situation.

Starting with FIG. 1 and continuing on to FIGS. 2 and 3, the method of mounting and sealing the probe to insure its being bottomed-out against the opposite pipe wall will now be described. Initially, as seen in FIG. 1, all the elements of the mounting assembly are loose and the remote end 46 of the probe body lies spaced apart from the opposite pipe wall 48. However, it is significant to note that the gap 52 left between the remote end 46 of the probe and the opposite pipe wall 48 is considerably smaller than the gap 50 left between the opposed surfaces of the near wall of the pipe bordering opening 18 therein or any other obstruction and the fixed abutment 14. Next, looking at FIG. 2, it can be seen that the cap nut 36 has been screwed down part way onto the threaded neck 34 of guide sleeve 26 so as to push the movable abutment 40 down atop the stack of packing rings 30 and spacers 32 which, in turn, press against the fixed abutment 14 to force the probe inward until its remote end 46 seats securely against the opposite pipe wall 48, all without the fixed abutment striking any abutment ahead of it. Significantly, the packing rings 30 will have been compressed very little since both the probe body 12 and its fixed abutment 14 can yield and move with them and the assembly thereabove as the portion 20 of the probe 10 moves on into the pipe. Once the remote end 46 of the probe body 12 seats against the opposite pipe wall 48, however, the situation changes and the sequence shown in FIG. 3 begins. Obviously, there can be no more essentially coordinated movement of the fixed and movable abutments, the probe body, the packing, the spacers and the cap nut as was the case up until the probe end 46 reached the opposite pipe wall since the probe and its fixed abutment have stopped all further movement relative to the pipe. On the other hand, the cap nut 36 can continue to move inward toward the pipe as it is screwed farther down onto the threaded neck 34 of guide sleeve 26. As the movable abutment and the cap nut move down relative to the fixed abutment as seen in FIG. 3, the packing 30 is compressed therebetween and expanded to fill the progressively smaller annular volume defined between these abutments and the opposed surfaces of the guide sleeve and the probe body inside thereof until an annular fluid-tight seal is formed therebetween. The tightly compressed packing, in addition to forming the annular seal, also securely fastens the probe in bottomed-out position within the pipe. It is important to note that the seal cannot be formed nor can the probe be held in a fixed position relative to the pipe until the probe is, in fact, bottomed-out as aforementioned because sequentially the probe must reach the end of its axial travel before the packing can be compressed. Also, the probe cannot back out of the pipe until the seal comes loose or is intentionally loosened. If, perchance, the seal comes loose or is loosened on purpose, the inturned flange 44 atop the cap nut 36 that engages the movable abutment 40 when screwed inward so as to fasten and seal the probe in place within its mounting assembly will also function in any of its various threadedly-connected positions to block the removal of probe and thus prevent a blowout. No novelty per se is predicated upon this feature since Spitzglass' collar 7 holding his sleeve 16 and plug 9 together will do the same thing. Even if his collar were not connected in some way to the sleeve, it would eventually come into contact with the inner end of packing gland 17 thus preventing a blowout provided that the packing gland was threadedly connected to the sleeve as he shows it.

Turning the attention briefly to FIG. 4, a slightly modified form of the mounting assembly 24M has been shown in which one or more wave or other form of spring-type washers 42 are interposed between the inturned flange 44 on the cap nut 36 and the top of the movable abutment 40. These washers are added for the purpose of maintaining the packing 28 under a more or less constant and yieldable, but nonetheless predictable, compression load which is somewhat more difficult to achieve with the cap nut itself. In addition, these washers function to take up any space caused by expansion of the pipe or relaxation of the packing so as to maintain packing loading. Nevertheless, the assembly works quite satisfactorily without them.

Finally, looking at FIG. 5, a still further modified form of the mounting assembly 24N has been shown wherein a cylindrical guide tube 26M is welded in place atop a centrally-apertured flange 54T that mates with a like flange 54B which, in the particular form shown, is formed integral with a collar 56 that defines a side-opening entryway 18M into the pipe 16M, the latter being of more or less conventional design. In accordance with standard practice, the flanges are bolted together using bolts 58 with a gasket 60 in between the flanges.

Replacing the cap nut 36 of FIGS. 1–4 is a cap plate 62 corresponding functionally to the inturned flange 44 of the latter but differing therefrom in that it contains a series of apertures 64 which align with corresponding internally threaded screw-receiving sockets 66 in the top of the sleeve 26M through which and into which the cap screws 68 thread. Thus, the cap plate, cap screws and guide tube cooperate in the same way as elements 26 and 36 of the previously-described embodiments to provide an actuator subassembly operative to push the movable abutment 40 down against the stack of packing rings 30 and spacers 32. The subassembly that comprises the aforementioned movable abutment 40, packing rings 30 and fixed abutment 14, with or without the spacers 32, remains the same as that of the previously-described embodiments and functions in the same way as the cap screws are screwed deeper into their respective sockets to draw down the cap plate. Some further modification of the flanged embodiment of FIG. 5 would, obviously, be required to accommodate the wave or other form of spring-type washers 42 without having to drill them to accept the cap screws. There remain, of course, other mounting assemblies, conventional and otherwise, that will accommodate the movable abutment, the packing and the annulus for the latter to expand into while forming the seal that will be the full functional equivalent of the instant invention, yet which have not been illustrated.

What is claimed is:

1. An apparatus for use in both seating a remote end of a pilot tube type flow meter probe against the opposite wall of a pipe in which it is being installed and also for sealing same within a tubular guideway that borders a side-opening probe-entry port in the pipe as it encircles a similarly-shaped section of the probe body in spaced relation thereto to form a seal-receiving annulus therebetween, the pipe being subject to size variations which can cause the diameter of the pipe to be oversized or undersized with respect to a design standard, which comprises: control means for ensuring that said probe remote end is seated against the opposite wall of the pipe before the probe is sealed within the tubular guideway, said control means including a fixed abutment movable with the prove body and sized for insertion into the seal-receiving annulus said fixed abutment being located on said probe body to define a gap between the sidewall of the pipe adjacent to said probe-entry port and said fixed abutment, said fixed abutment being positioned on said probe body with respect to the remote end of the probe so that the size of the gap exceeds a maximum oversize variation in the diameter of the pipe and so that no stop-forming obstruction is located between said fixed abutment and the pipe sidewall adjacent to said probe entry port so that when the probe remote end is seated against the opposite wall of the pipe and after sealing there is no compressive force applied to said fixed abutment by the pipe sidewall adjacent to said probe-entry port; sealing means for sealing the probe body within the tubular guideway comprising compressible packing material movable along said body within the seal-receiving annulus into abutting relation with the fixed abutment on the side of said fixed abutment opposite to the remote probe end, said compressible packing material being adapted to expand into contact with the guideway when compressed and being movable axially of the guideway before being compressed; and, a movable abutment movably positioned on the probe body at a location spaced from said fixed abutment and being movable into position to push the packing material against the fixed abutment and force the fixed abutment along with the probe forwardly toward the opposite pipe wall until the remote end of the probe seats against the opposite pipe wall, and said movable abutment upon further movement toward said probe remote end being operative to narrow the space between it and the fixed abutment thereby compressing and expanding the packing material into contact with the guideway to form a continuous annular fluid tight seal around the probe body.

2. The apparatus as set forth in claim 1 in which: the movable abutment includes actuating means detachably connectable to the tubular guideway for axial movement relative thereto along the probe body, said movable abutment and actuating means when the latter is thus connected cooperating to define a stop effective to engage the packing and limit the movement of the probe in a direction to withdraw same from the pipe.

3. The apparatus as set forth in claim 2 in which: the actuating means comprises a centrally-apertured cup threadedly attachable to the tubular guide member for rotational as well as axial movement relative thereto and to the probe and packing.

4. The apparatus as set forth in claim 3 in which: the stack of compressible rings is bordered on both ends by substantially non-compressible rings defining spacers between said stack and the fixed and movable abutments.

5. The apparatus as set forth in claim 1 in which: the packing material comprises a stack of at least two compressible rings.

6. The apparatus as set forth in claim 1 in which: the fixed abutment comprises a continuous annular rib encircling the probe body.

7. The apparatus as set forth in claim 1 in which: the movable abutment includes a ring at least partially encircling the probe body sized for insertion into the packing-receiving annulus.

8. The apparatus as set forth in claim 1 in which: the movable abutment comprises a subassembly including a ring encircling the probe body for axial movement therealong in abutting relation to the packing and an actuating means detachably connectable to the tubular guideway for axial movement relative thereto along the pipe in abutting relation to said ring.

9. The apparatus as set forth in claim 8 in which: the subassembly includes at least one spring-type washer interposed between the actuating means and the movable abutment encircling the probe body within the packing-receiving annulus.

10. The apparatus as set forth in claim 8 in which: the actuating means of the subassembly comprises a centrally-apertured cup sized to slide along the probe body into abutting engagement with the movable abutment, said cup being threadedly connectable to the tubular guideway for rotational and axial movement relative thereto and to said abutments, packing material and probe body.

11. The method for seating the remote end of a pitot tube type flow meter probe against the opposite wall of a pipe into which it is being installed and thereafter sealing and holding same in fixed axial position within a tubular guideway through which it enters a side-opening port in said pipe which comprises the steps of: mounting compressible packing material on the probe and spacing that compressible packing material from the tubular guideway to define an annular space between the compressible packing material and the tubular guideway with the packing material being axially movable in that space with respect to that guideway; using a movable abutment to push against the compressible packing material and force that compressible packing material against a fixed abutment carried by said probe body thereby forcing the latter inward until it bottoms-out on the opposite pipe wall and thereafter continuing to advance the movable abutment to narrow the gap between it and the fixed abutment so as to compress the packing between the two until it expands into contact with the tubular guideway to fill the annular space and form a fluid-tight seal around said probe body while simultaneously holding same in bottomed-out position within the pipe.

12. The method as set forth in claim 11 which includes the step of: interconnecting the movable abutment and tubular guideway for relative axial movement such that they cooperate when so connected to block and prevent withdrawal of the probe body from the pipe.

13. An apparatus for use in both seating a remote end of a pitot tube type flow meter probe against the opposite wall of a pipe in which it is being installed and also for sealing same within a tubular guideway that borders a side-opening probe-entry port in the pipe as it encircles a similarly-shaped section of the probe body in spaced relation thereto to form a seal-receiving annulus therebetween, the pipe being subject to size variations which can cause the diameter of the pipe to be oversized or undersized with respect to a design standard, which comprises: control means for ensuring that said probe remote end is seated against the opposite wall of the pipe before the probe is sealed within the tubular guideway, said control means including a fixed abutment sized for insertion into the seal-receiving annulus and mounted on the probe body for movement therewith, said fixed abutment being located on said probe body to define a gap between the sidewall of the pipe adjacent to said probe-entry port and said tixed abutment, said fixed abutment being positioned on said probe body with respect to the remote end of the probe so that the size of the gap exceeds a maximum oversize variation in the diameter of the pipe and so that no stop-forming obstruction is located between said fixed abutment and the pipe sidwall adjacent to said probe entry port so that when the probe remote end is seated against the opposite wall of the pipe and after sealing there is no compressive force applied to said fixed abutment by the pipe sidewall adjacent to said probe-entry port; sealing means for sealing the probe body within the tubular guideway comprising compressible packing material movable along said probe body within the seal-receiving annulus into abutting relation against the fixed abutment; and, a movable abutment movably located on said probe body to be spaced from said fixed abutment and adapted to be moved into a position to push the packing material against the fixed abutment and force the fixed abutment along with the probe toward the opposite wall of the pipe until the remote end of the probe seats against the opposite pipe wall, a movable abutment actuating means movably attached to the tubular guideway, said movable abutment being sized so that said movable abutment, said movable abutment actuating means, and said tubular guideway remain operatively associated for oversized and undersized pipes, said movable abutment having one surface located to be engaged by said movable abutment actuating means and another surface located to engage said packing material to move said packing material when said actuating means moves said movable abutment via said movable abutment one surface, said movable abutment upon further forward movement toward said probe remote end after said remote end has seated against the opposite wall of the pipe being operative to narrow the space between it and the fixed abutment in a manner which compresses and expands the packing material into engagement with said tubular guideway to form a continuous anuular fluid-tight seal around the probe body.

14. An apparatus for use in both seating the remote end of a pitot tube type flow meter probe against the opposite wall of a pipe in which it is being installed and also for sealing same wtihin a tubular guideway that borders a side-opening probe-entry port in the probe body in spaced relation thereto to form a seal-receiving annulus therebetween with the probe having one end which is adapted to extend out of the pipe when the probe is in position on the pipe, the pipe being subject to size variations which can cause the diameter of the pipe to be oversized or undersized with respect to a design standard, the apparatus comprising: control means for ensuring that said probe remote end is seated against the opposite wall of the pipe before the probe is sealed within the tubular guideway, said control means including a fixed abutment mounted on the probe body for movement therewith, said fixed abutment being located on said probe body to define a gap between the sidewall of the pipe adjacent to said probe-entry port and said fixed abutment, said fixed abutment being positioned on said probe body with respect to the remote end of the prove so that the size of the gap exceeds a maximum oversize variation in the diameter of the pipe and so that no stop-forming obstruction is located between said fixed abutment and the pipe sidewall adjacent to said probe entry port so that when the probe remote end is seated against the opposite wall of the pipe and after sealing there is no compressive force applied to said fixed abutment by the pipe sidewall adjacent to said probe-entry port; sealing means for sealing the probe body within the tubular guideway, said sealing means including compressible packing material positioned on said probe body and adapted to expand radially outward from said probe body when compressed axially of said probe body, said packing material being mounted on said probe body and sized to move with said probe body within said seal-receiving annulus into abutting contact with the fixed abutment which is located on the probe so the compressible packing material is located between the one end of the probe and the fixed abutment, and a movable abutment movably mounted on said probe body at a location spaced from said fixed abutment and movable along the probe body into position to push the compressible packing material against the fixed abutment and force the packing material along with the probe forwardly toward the opposite pipe wall until the remote end of said probe seats against the opposite pipe wall, and said movable abutment upon further movement toward the probe remote end being operative to narrow the space between it and the fixed abutment for axially compressing and radially expanding the compresssible packing material to force that compressible packing material against the tubular guideway to form a continuous annular fluid-tight seal around the probe body after the probe has seated against the opposite pipe wall, said compressible packing material being sized and arranged relative to said seal-receiving annulus so that said fluid-tight seal is formed only after said probe has seated against the opposite pipe wall.

15. The method for seating the remote end of a pitot tube type flow meter probe against the opposite wall of a pipe into which it is being installed and thereafter sealing and holding same in fixed axial position within a tubular guideway through which it enters a side-opening port in said pipe which comprises the steps of: positioning the compressible packing material on the probe to be located within an annular space provided therefor between the outside of the probe and the inside of the tubular guideway; then using movable abutment to push against the compressible packing material and to force that packing material against a fixed abutment mounted on said probe to force said probe toward the opposite pipe wall until it bottoms-out on that opposite pipe wall, and therafter continuing to advance the movable abutment to narrow the gap between it and the fixed abutment so as to compress the packing between the two until it expands to fill the annular space and into contact with the guideweay; forming a fluid-tight seal around said probe only after the probe has bottomed-out against the opposite pipe wall; and simultaneously holding said probe in the bottomed-out position against the opposite pipe wall while forming said fluid-tight seal.

* * * * *